(12) United States Patent
Ichida

(10) Patent No.: US 9,384,388 B2
(45) Date of Patent: Jul. 5, 2016

(54) OBJECT RECOGNITION DEVICE AND VEHICLE CONTROLLER

(75) Inventor: Hiroyasu Ichida, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 158 days.

(21) Appl. No.: 14/373,812

(22) PCT Filed: Jan. 26, 2012

(86) PCT No.: PCT/JP2012/051704
§ 371 (c)(1),
(2), (4) Date: Jul. 22, 2014

(87) PCT Pub. No.: WO2013/111310
PCT Pub. Date: Aug. 1, 2013

(65) Prior Publication Data
US 2014/0341432 A1  Nov. 20, 2014

(51) Int. Cl.
*G06K 9/00* (2006.01)
*G08G 1/16* (2006.01)

(52) U.S. Cl.
CPC ........ *G06K 9/00335* (2013.01); *G06K 9/00805* (2013.01); *G08G 1/165* (2013.01); *G08G 1/166* (2013.01)

(58) Field of Classification Search
CPC ........... G06K 9/00791; G06K 9/00805; G06T 7/002; G06T 7/004; G06T 7/20; G06T 2207/30252; G06T 2207/30261; G08G 1/16; G08G 1/165; G08G 1/166; G01S 13/931
See application file for complete search history.

(56) References Cited

U.S. PATENT DOCUMENTS

| | | | |
|---|---|---|---|
| 7,957,858 B1 * | 6/2011 | Larson et al. | 340/435 |
| 2006/0149452 A1 | 7/2006 | Sawamoto et al. | 701/70 |
| 2009/0027180 A1 | 1/2009 | Shibata et al. | 340/435 |
| 2010/0324771 A1 * | 12/2010 | Yabushita et al. | 701/25 |
| 2011/0285574 A1 | 11/2011 | Tsunekawa | 342/70 |

FOREIGN PATENT DOCUMENTS

| | | | |
|---|---|---|---|
| JP | 2006-127194 A | 5/2006 | |
| JP | 2009-031053 A | 2/2009 | |
| JP | 2011-117895 A | 6/2011 | |

\* cited by examiner

*Primary Examiner* — Andrew W Johns
(74) *Attorney, Agent, or Firm* — Sughrue Mion, PLLC

(57) ABSTRACT

An object recognition device includes a sensor (2) that detects a preceding vehicle (V) and a stationary object (O) on a road, a first locus calculating unit (11) that calculates a relative movement locus (Tv) of the preceding vehicle (V) to a vehicle (1) on the basis of a history of a detected position of the preceding vehicle (V), a second locus calculating unit (12) that calculates a relative movement locus (To) of the stationary object (O) to the vehicle (1) on the basis of a history of a detected position of the stationary object (O), and an object recognizing unit (14) that recognizes the stationary object (O) as an object not serving as an obstacle in traveling when the movement loci (Tv, To) intersect each other.

6 Claims, 10 Drawing Sheets

OBJECT RECOGNITION DEVICE AND VEHICLE CONTROLLER

TECHNICAL FIELD

The present invention relates to an object recognition device and a vehicle controller.

BACKGROUND ART

In the related art, for example, as disclosed in JP 2006-127194 A, an object recognition device is known which recognizes a preceding vehicle, which is referred to in controlling traveling of a vehicle, in distinction from a fixed object or the like on a road.

The object recognition device stores a position of an object detected by a radar device, sets a determination area centered on the detected position, and determines a passing direction when one object passes through the determination area set on the other object. An object of which the passing direction is a direction approaching the vehicle is recognized as a fixed object or the like on a road.

CITATION LIST

Patent Literature

PTL 1: Japanese Patent Application Publication No. 2006-127194 (JP 2006-127194 A)

SUMMARY OF THE INVENTION

Technical Problem

However, in the related art, when an object not serving as an obstacle in traveling of a vehicle needs to be recognized, there is room for improvement in recognition accuracy and rate.

For example, when an object is recognized using a millimeter wave sensor, an iron plate, a road sign, or the like on a road may be recognized as an object serving as an obstacle in traveling. When reflected waves of millimeter waves are analyzed to recognize an object, detection of an object close to a preceding vehicle may be delayed and thus the analysis may not be sufficiently analyzed.

Therefore, an object of the present invention is to provide an object recognition device that can appropriately recognize an object not serving as an obstacle in traveling of a vehicle and a vehicle controller that can appropriately control traveling of a vehicle.

Solution to Problem

According to an aspect of the present invention, there is provided an object recognition device including: an object detecting unit that detects a preceding vehicle and a stationary object on a road; a first locus calculating unit that calculates a relative movement locus of the preceding vehicle to a vehicle on the basis of a history of a detected position of the preceding vehicle; a second locus calculating unit that calculates a relative movement locus of the stationary object to the vehicle on the basis of a history of a detected position of the stationary object; and an object recognizing unit that recognizes the stationary object as an object not serving as an obstacle in traveling when the movement loci intersect each other.

The object recognition device according to the present invention can easily determine whether the preceding vehicle passes through the stationary object by determining whether the movement locus of the preceding vehicle and the movement locus of the stationary object intersect each other, and can rapidly recognize an object not serving as an obstacle in traveling of the vehicle with high accuracy.

The second locus calculating unit may estimate the position of the stationary object at a time point before the stationary object is detected, and may calculate the movement locus of the stationary object on the basis of the detected position and the estimated position of the stationary object. Accordingly, it is possible to appropriately recognize an object not serving as an obstacle even when the detection of the stationary object is delayed.

The object recognition device may further include an intersection determining unit that determines whether the positions of the preceding vehicle and the stationary object coincide with each other when the movement loci intersect each other and the preceding vehicle and the stationary object are closest to each other, and the object recognizing unit may recognize the stationary object as an object not serving as an obstacle in traveling when the positions of the preceding vehicle and the stationary object coincide with each other. Accordingly, it is possible to accurately recognize an object not serving as an obstacle.

The second locus calculating unit may calculate the movement locus of the stationary object on the basis of a road shape in front of the vehicle. Accordingly, it is possible to calculate the movement locus of the stationary object with high accuracy and to appropriately recognize an object not serving as an obstacle.

The first locus calculating unit may calculate the movement locus of the preceding vehicle on the basis of movement histories of a plurality of points set on the preceding vehicle. Accordingly, it is possible to calculate the movement locus of the preceding vehicle with high accuracy and to accurately recognize an object not serving as an obstacle.

According to another aspect of the present invention, there is provided a vehicle controller including: an object detecting unit that detects a preceding vehicle and a stationary object on a road; a first locus calculating unit that calculates a relative movement locus of the preceding vehicle to a vehicle on the basis of a history of a detected position of the preceding vehicle; a second locus calculating unit that calculates a relative movement locus of the stationary object to the vehicle on the basis of a history of a detected position of the stationary object; and a traveling control unit that suppresses performing of a collision avoiding control when the movement loci intersect each other.

The vehicle controller according to the present invention can easily determine whether the preceding vehicle passes through the stationary object by determining whether the movement locus of the preceding vehicle and the movement locus of the stationary object intersect each other, and can control traveling of the vehicle on the basis of the determination result.

Advantageous Effects

According to the present invention, it is possible to provide an object recognition device that can appropriately recognize an object not serving as an obstacle in traveling of a vehicle and a vehicle controller that can appropriately control traveling of a vehicle.

MODES FOR CARRYING OUT THE INVENTION

Hereinafter, an embodiment of the present invention will be, described in detail with reference to the accompanying drawings. In the below description with reference to the drawings, identical elements will be referenced by identical reference signs and description thereof will not be repeated.

First, the configuration of a vehicle controller according to an embodiment of the present invention will be described below with reference to FIG. 1. The vehicle controller is a device that controls traveling of a vehicle 1 by determining whether a preceding vehicle passes through a stationary object depending on whether a movement locus of the preceding vehicle and a movement locus of the stationary object intersect each other.

Figure 1:
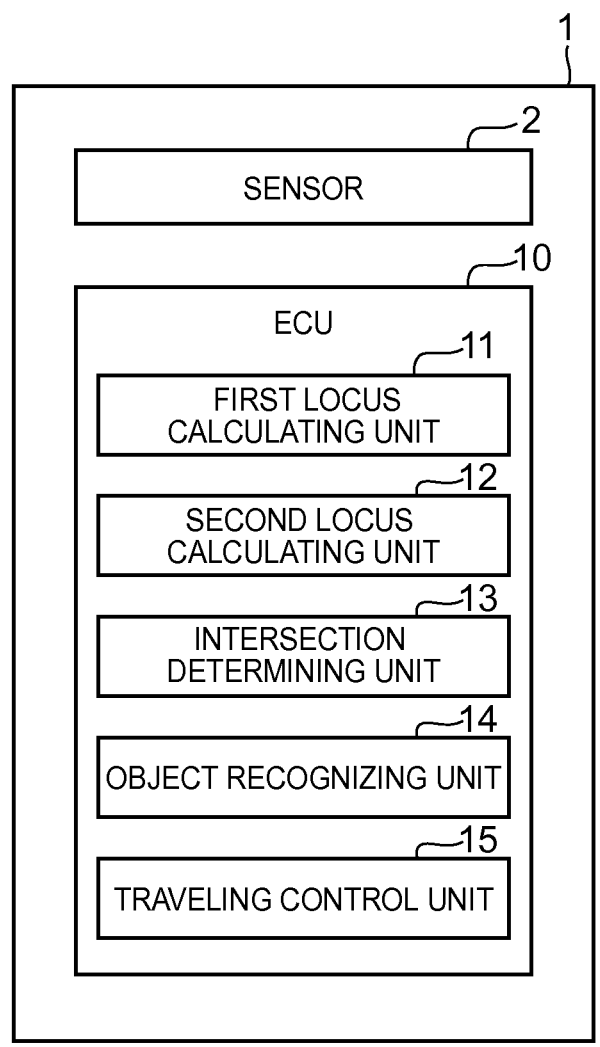
FIG. 1 is a block diagram illustrating a configuration of a vehicle controller according to an embodiment of the present invention.

As illustrated in FIG. 1, the vehicle controller includes a sensor 2 and an electronic control unit (ECU) 10.

The sensor 2 constitutes an object detecting unit that detects a preceding vehicle and a stationary object on a road. Here, examples of the stationary object include fixed objects or installed objects (such as an iron plate, a draining trench, a road illumination, a traffic strip, a road sign, and a road bridge) and dropped objects on a road.

The sensor 2 includes, for example, a millimeter wave radar, but may include another sensor such as a laser sensor as long as it can detect an object. The sensor 2 transmits detection waves to the front side of the vehicle 1, receives reflected waves from an object on the front side, and detects a position of an object, which includes a preceding vehicle and a stationary object O, by detecting a distance between the vehicle 1 and the object and a relative speed of the object to the vehicle 1. It is determined which of a preceding vehicle, a stationary object O, and an oncoming vehicle the object is on the basis of the variation of the detected value.

The position of an object is specified by a relative distance indicating a gap from the vehicle 1 in the traveling direction (longitudinal direction) of the vehicle 1 and a relative transverse position indicating a gap to the vehicle 1 in the width direction (transverse direction) of the vehicle 1. For example, the position of an object is specified by coordinates using the traveling direction (longitudinal direction) of the vehicle 1 as a y axis and the width direction (transverse direction) of the vehicle 1 as an x axis with respect to the center of the front part of the vehicle 1.

The ECU 10 is an onboard controller including a CPU, a ROM, and a RAM. The ECU 10 includes a first locus calculating unit 11, a second locus calculating unit 12, an intersection determining unit 13, an object recognizing unit 14, and a traveling control unit 15. Here, the first locus calculating unit 11, the second locus calculating unit 12, the intersection determining unit 13, and the object recognizing unit 14 constitute an object recognition device along with the sensor 2. The traveling control unit 15 constitutes a vehicle controller along with the sensor 2 and the constituent units 11 to 14 of the object recognition device. The constituent units 11 to 15 are embodied by software that is executed by the ECU 10. The constituent units 11 to 15 may be distributed to two or more ECUs.

The first locus calculating unit 11 calculates a relative movement locus of a preceding vehicle to the vehicle 1 on the basis of the history of the detected position of the preceding vehicle. The movement locus of the preceding vehicle is calculated as a line segment connecting the current detected position of the preceding vehicle and the detected position thereof before a predetermined time. The current time is a time point at which it is determined whether the movement locus of the preceding vehicle and the movement locus of a stationary object intersect each other, and the predetermined time is a time (retroactive time) required for determination of the intersection and is generally set to a time longer than the sampling period of the sensor 2. For example, the position of a preceding vehicle is detected as the center, the left end, and the right end of the preceding vehicle when seen from the vehicle 1.

The second locus calculating unit 12 calculates a relative movement locus of a stationary object to (movement of) the vehicle 1 on the basis of the history of the detected position of the stationary object. In this case, the movement locus of the stationary object is calculated as a line segment connecting the current detected position of the stationary object and the detected position thereof before a predetermined time. The second locus calculating unit 12 estimates the position of the stationary object at a time point before detecting the stationary object and calculates the movement locus of the stationary object on the basis of the detected position and the estimated position of the stationary object. In this case, the movement locus of the stationary object is calculated as a line segment connecting the current detected position and the estimated position before a predetermined time. For example, the position of a stationary object is detected or estimated as the center, the left end, and the right end of the stationary object when seen from the vehicle 1.

The intersection determining unit 13 determines whether the movement locus of the preceding vehicle and the movement locus of the stationary object intersect each other. Whether the movement loci intersect each other is determined, for example, by solving simultaneous equations relevant to the line segment of the movement locus of the preceding vehicle and the line segment of the movement locus of the stationary object. The intersection determining unit 13 determines whether the positions of the preceding vehicle and the stationary object coincide with each other when both are closest to each other. Whether both positions coincide with each other is determined, for example, by comparing the position of the stationary object with a presence area of the preceding vehicle.

The object recognizing unit 14 recognizes the stationary object as object not serving as an obstacle in traveling when the movement locus of the preceding vehicle and the movement locus of the stationary object intersect each other. The object recognizing unit 14 may recognize the stationary object as an object not serving as an obstacle in traveling when the positions of the preceding vehicle and the stationary object coincide with each other at the time of getting closest to each other.

The traveling control unit 15 suppresses performing of a collision avoiding control when the movement locus of the preceding vehicle and the movement locus of the stationary object intersect each other. That is, the traveling control unit 15 normally performs a predetermined control of outputting a control signal to a braking mechanism and a steering mechanism (both of which are not illustrated) or the like so as to avoid a collision with an obstacle, but does not perform such a control when the movement locus of the preceding vehicle and the movement locus of the stationary object intersect each other. The traveling control unit 15 may suppress performing the collision avoiding control when the positions of the preceding vehicle and the stationary object coincide with each other at the time of getting closest to each other.

Operations of the object recognition device and the vehicle controller will be described below with reference to FIGS. 2 to 9.

Figure 2:
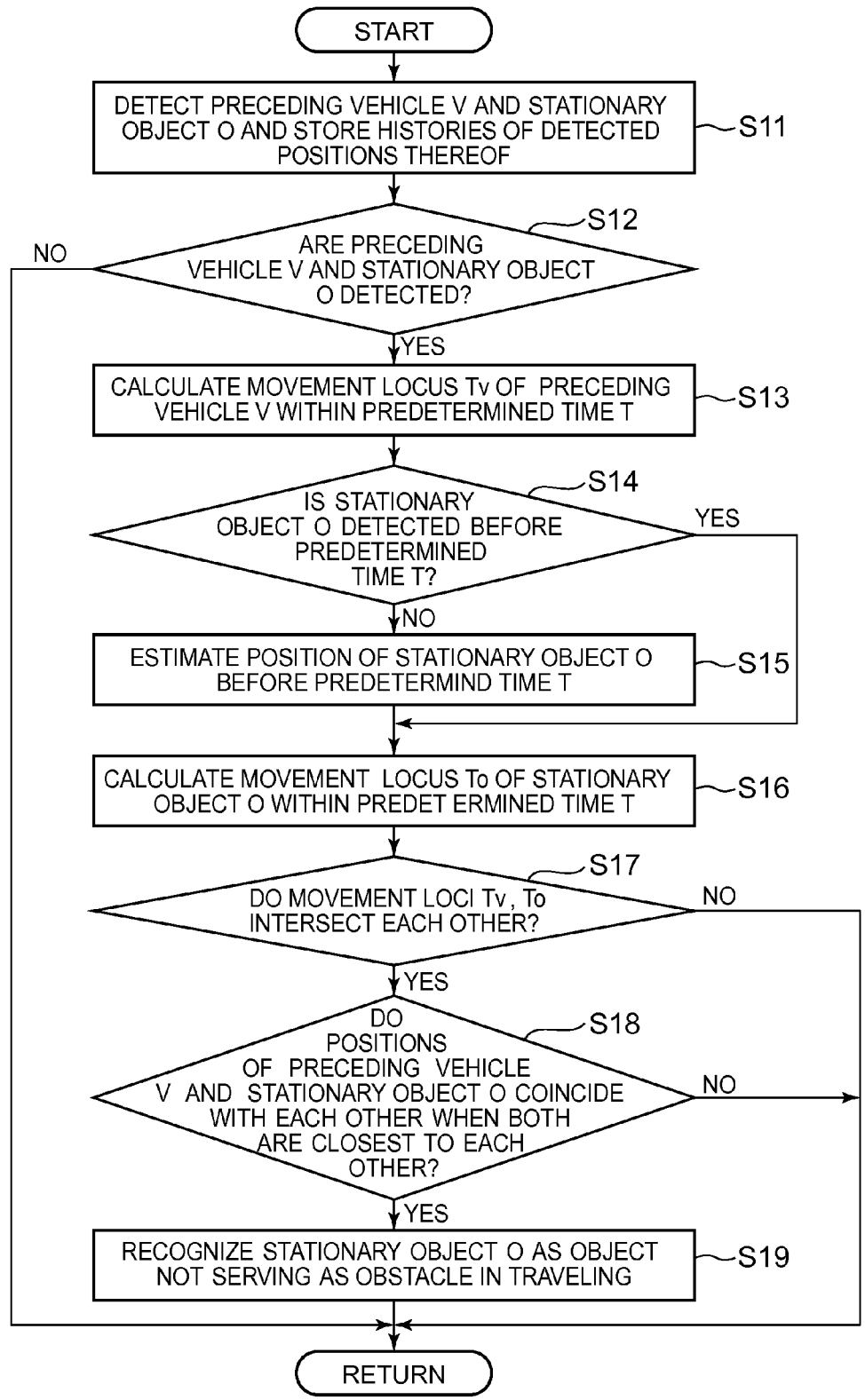
FIG. 2 is a flowchart illustrating an operation of an object recognition device.

FIG. 2 is a flowchart illustrating the operation of the object recognition device. For symbols in FIG. 2, referring to FIG. 4 and the like is recommended. The object recognition device repeatedly performs a series of processes illustrated in FIG. 2, for example, with a predetermined cycle of about 10 ms to 100 ms. As illustrated in FIG. 2, in step S11, the sensor 2 detects a preceding vehicle V and a stationary object O and the ECU 10 stores histories of the detection positions thereof.

That is, the sensor 2 detects the relative position (relative distance, relative transverse position) of the preceding vehicle V and the stationary object O to the vehicle 1. In parallel with detection by the sensor 2, the ECU 10 acquires steering angle information from a steering angle sensor (not illustrated) and acquires vehicle speed information from a vehicle wheel speed sensor (not illustrated). The ECU 10 stores the detected values at least for a predetermined time T. The predetermined time T is a time (retroactive time) required for determination of the intersection and is set to a shorter time as the vehicle speed of the vehicle 1 becomes higher, for example, to 0.5 s to 1.0 s.

In step S12, the ECU 10 determines whether a preceding vehicle V and a stationary object O are detected. Here, the determination of intersection of step S13 and steps subsequent thereto is performed when it is determined that a preceding vehicle V and a stationary object O are detected, and the process flow ends when it is determined that both are not detected.

Here, before performing the determination of intersection of step S13 and steps subsequent thereto, it is preferable that the ECU 10 perform the following processes.

Firstly, the ECU 10 preferably determines whether the vehicle speed, the relative distance to the object, the average steering angle within the predetermined time T, and the like satisfy set threshold values. When the values satisfy the set threshold values, the recognition process is effectively performed and thus the determination of intersection is performed. When the values do not satisfy the set threshold values, the process flow ends.

Secondly, the ECU 10 preferably excludes a specific object from the determination target. Here, the determination of intersection is basically performed on all combinations of the preceding vehicles V and the stationary objects O having been detected. That is, for example, when four preceding vehicles V and four stationary objects O are detected, 16 sets of determination of intersection are basically performed. However, exceptionally, a preceding vehicle V of which the position before the predetermined time T is not detected is not effectively subjected to the recognition process and thus is excluded from the determination target. A stationary object O recognized in advance to be an obstacle or not is excluded from the determination target, as long as it is newly detected as a preceding vehicle V or an oncoming vehicle or is not detected as an object (is lost).

Thirdly, as will be described below, the ECU 10 preferably sets the presence area A of a preceding vehicle V and determines whether a stationary object O is located in the presence area A. The stationary object O located in the presence area A is determined to be passed by the preceding vehicle V and is excluded from the determination target.

Figure 3:
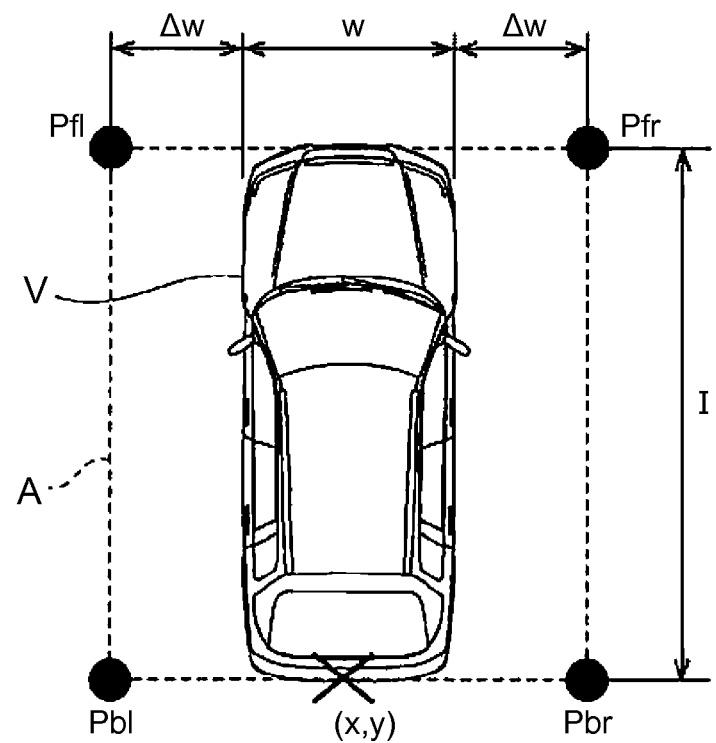
FIG. 3 is a diagram illustrating a method of setting a presence area of a preceding vehicle.

The presence area A of the preceding vehicle V is set to a rectangular area defined by positions Pbl, Pbr, Pfl, and Pfr expressed by Expressions (1) to (4) when the current detected position (x, y) is the center of the rear part of the preceding vehicle V as illustrated in FIG. 3.

$$Pbl=(x-w/2-\Delta w, y) \quad (1)$$

$$Pbr=(x+w/2+\Delta w, y) \quad (2)$$

$$Pfl=(x-w/2-\Delta w, y+l) \quad (3)$$

$$Pfr=(x+w/2+\Delta w, y+l) \quad (4)$$

Here, regarding symbols in Expressions (1) to (4), l represents the total length of the preceding vehicle V, w represents the vehicle width, and $\Delta w$ represents the correction value of the vehicle width. In the expressions, $l \approx 2.5$ m, $w \approx 1.8$ m, and $\Delta w \approx 0.2$ m to 0.3 m are set, for example, for a general automobile. The vehicle width correction value $\Delta w$ is set to a relatively small value when plural objects are grouped in the recognition process.

In step S13 of FIG. 2, when it is determined in step S12 that the preceding vehicle V and the stationary object O are detected, the first locus calculating unit 11 calculates the movement locus Tv of the preceding vehicle V for a predetermined time T. The movement locus Tv of the preceding vehicle V is calculated as a line segment connecting the current detected position and the detected position before the predetermined time T.

In step S14, the ECU 10 determines whether the stationary object O is detected before the predetermined time T. When it is determined that the stationary object O is detected, the second locus calculating unit 12 calculates the movement locus To of the stationary object O for the predetermined time T in step S16. In this case, the movement locus To of the stationary object O is calculated as a line segment connecting the current detected position and the detected position before the predetermined time T.

On the other hand, when it is determined that the stationary object O is not detected, the second locus calculating unit 12 estimates the position of the stationary object O before the predetermined time T, that is, the position of the stationary object O at a time point before the stationary object O is detected, in step S15. The position estimating method will be described later. In step S16, the second locus calculating unit 12 calculates the movement locus To of the stationary object O for the predetermined time T. In this case, the movement locus To of the stationary object O is calculated as a line segment connecting the current detected position and the estimated position before the predetermined time T.

Figure 4:
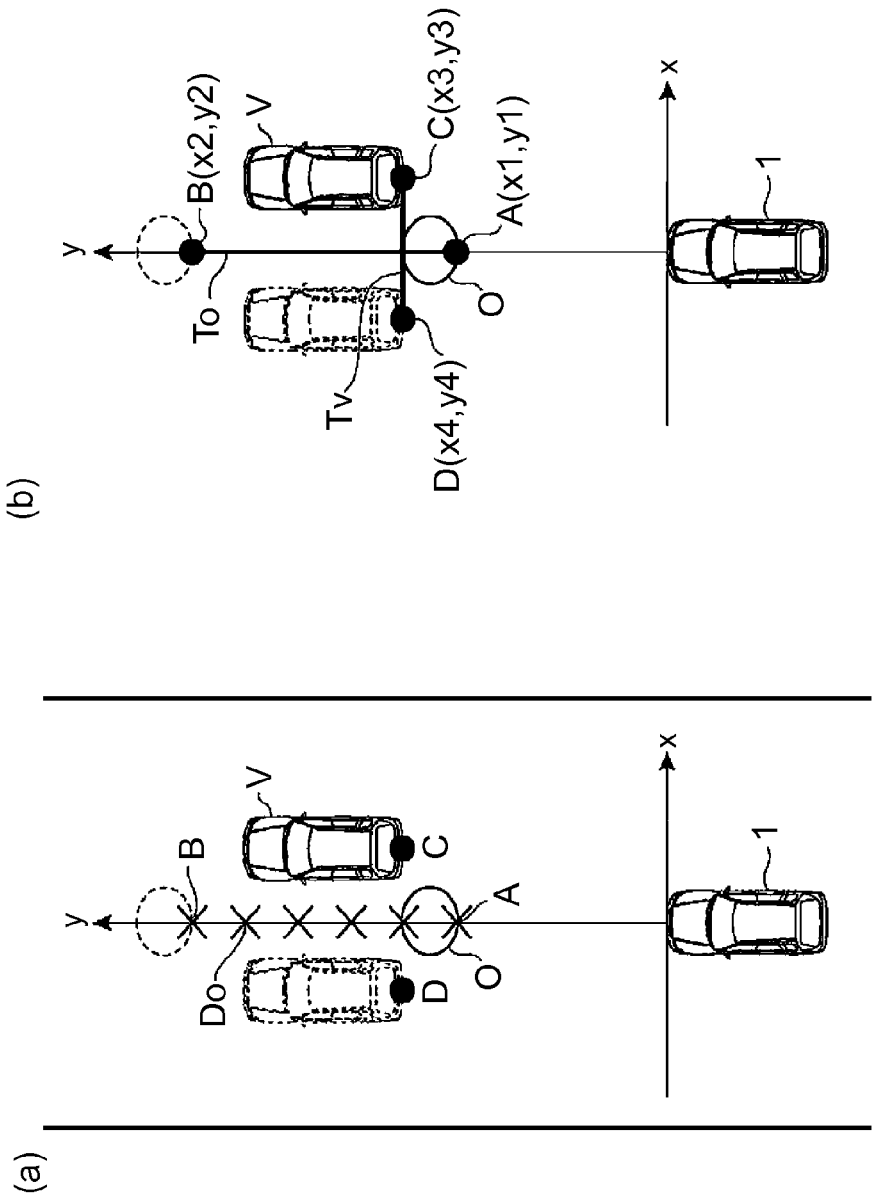
FIG. 4 is a diagram illustrating a method of calculating a movement locus of a stationary object on a straight road on the basis of a detected position.

The method f calculating the movement locus Tv of a preceding vehicle V and the movement locus To of an stationary object O will be described below with reference to FIGS. 4 to 7. FIG. 4 is a diagram illustrating a method of calculating the movement locus To of a stationary object O on a straight road on the basis of the detected position. FIG. 4(a) illustrates the history of the detected position Do of the stationary object O along with the relative positional relationship of the preceding vehicle V and the stationary object O to the vehicle 1. In this example, the preceding vehicle V moves from the detected position D to the detected position C with a constant inter-vehicle gap from the vehicle 1. The stationary object O moves from the detected position B to the detected position A for the predetermined time T with the traveling of the vehicle 1, as can be seen from the history of the detected position Do.

FIG. 4(b) illustrates the movement locus To of the preceding vehicle V and the stationary object O. A position A(x1, y1) represents the current position of the stationary object O and a position B(x2, y2) represents the position before the predetermined time T. A position C(x3, y3) represents the current position of the preceding vehicle V and a position D(x4, y4) represents the position before the predetermined time T. The movement locus Tv of the preceding vehicle V is calculated as a line segment CD connecting the detected position C and the detected position D, and the movement locus To of the stationary object O is calculated as a line segment AB connecting the detected position A and the detected position B.

Figure 5:
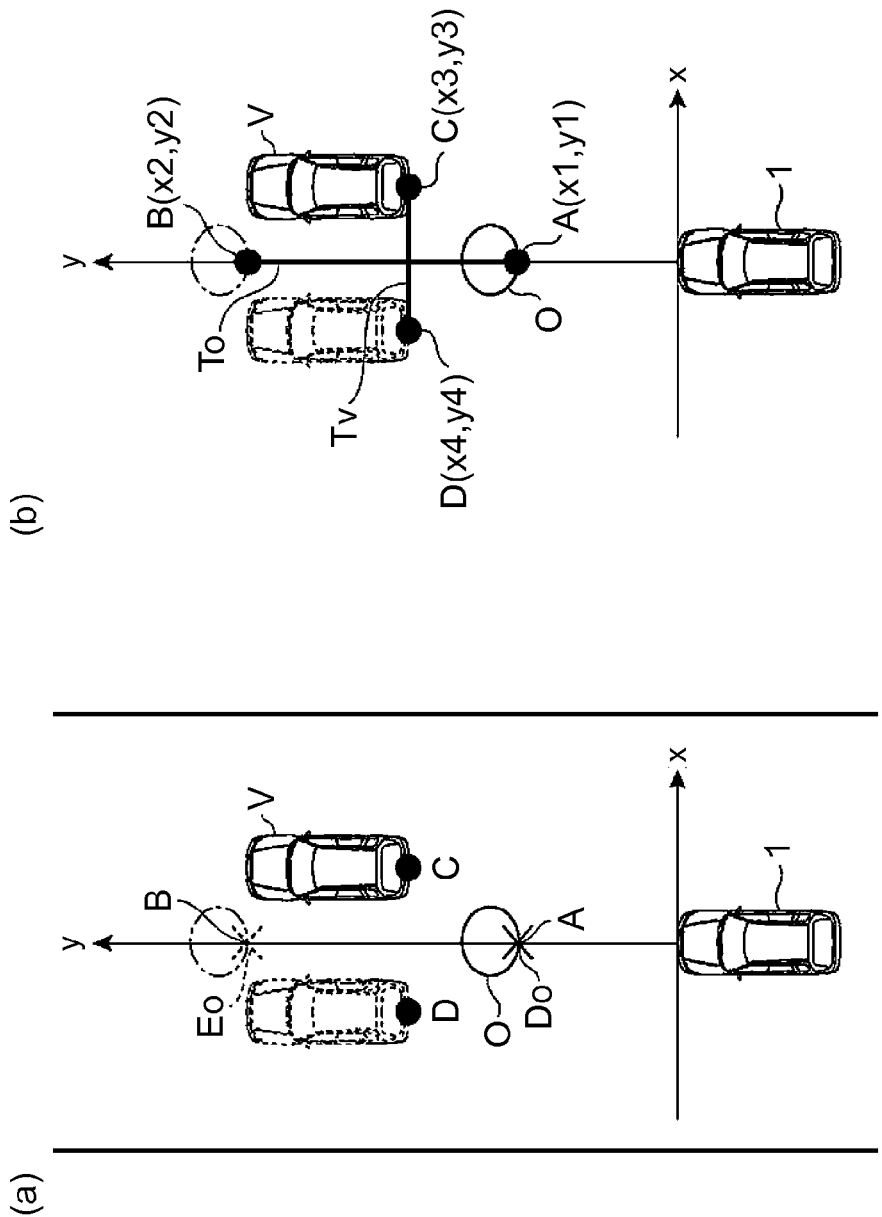
FIG. 5 is a diagram illustrating a method of calculating a movement locus of a stationary object on a straight road on the basis of a detected position and an estimated position.

FIG. 5 is a diagram illustrating a method of calculating the movement locus To of the stationary object O on a straight road on the basis of the detected position Do and the estimated position Eo. FIG. 5(a) illustrates the detected position Do and the estimated position Eo of the stationary object O along with the relative positional relationship of the preceding vehicle V and the stationary object O to the vehicle 1. In this example, the preceding vehicle V moves from the detected position D to the detected position C with a constant inter-vehicle gap from the vehicle 1. The stationary object O is first detected at the detected position A and thus the position B before the predetermined time T is estimated retroactively from the position A.

Here, the estimated position B(x2, y2) on the straight road is calculated using the average vehicle speed of the vehicle 1. The average vehicle speed is calculated on the basis of vehicle speed information acquired for the predetermined time T. The estimated value y2 is calculated by multiplying the average vehicle speed by the predetermined time T to obtain the displacement in the y direction and adding the displacement to the current detected value y1. When the steering angle is changed for the predetermined time T, the estimated value x2 is calculated by calculating the displacement in the x direction on the basis of the average steering angle and the displacement in the y direction and adding the displacement to the current detected value x1.

FIG. 5(b) illustrates the movement loci Tv and To of the preceding vehicle V and the stationary object O. The movement locus Tv of the preceding vehicle V is calculated as a line segment CD connecting the detected position C(x3, y3) and the detected position D(x4, y4), and the movement locus To of the stationary object O is calculated as a line segment AB connecting the detected position A(x1, y1) and the estimated position B(x2, y2).

Figure 6:
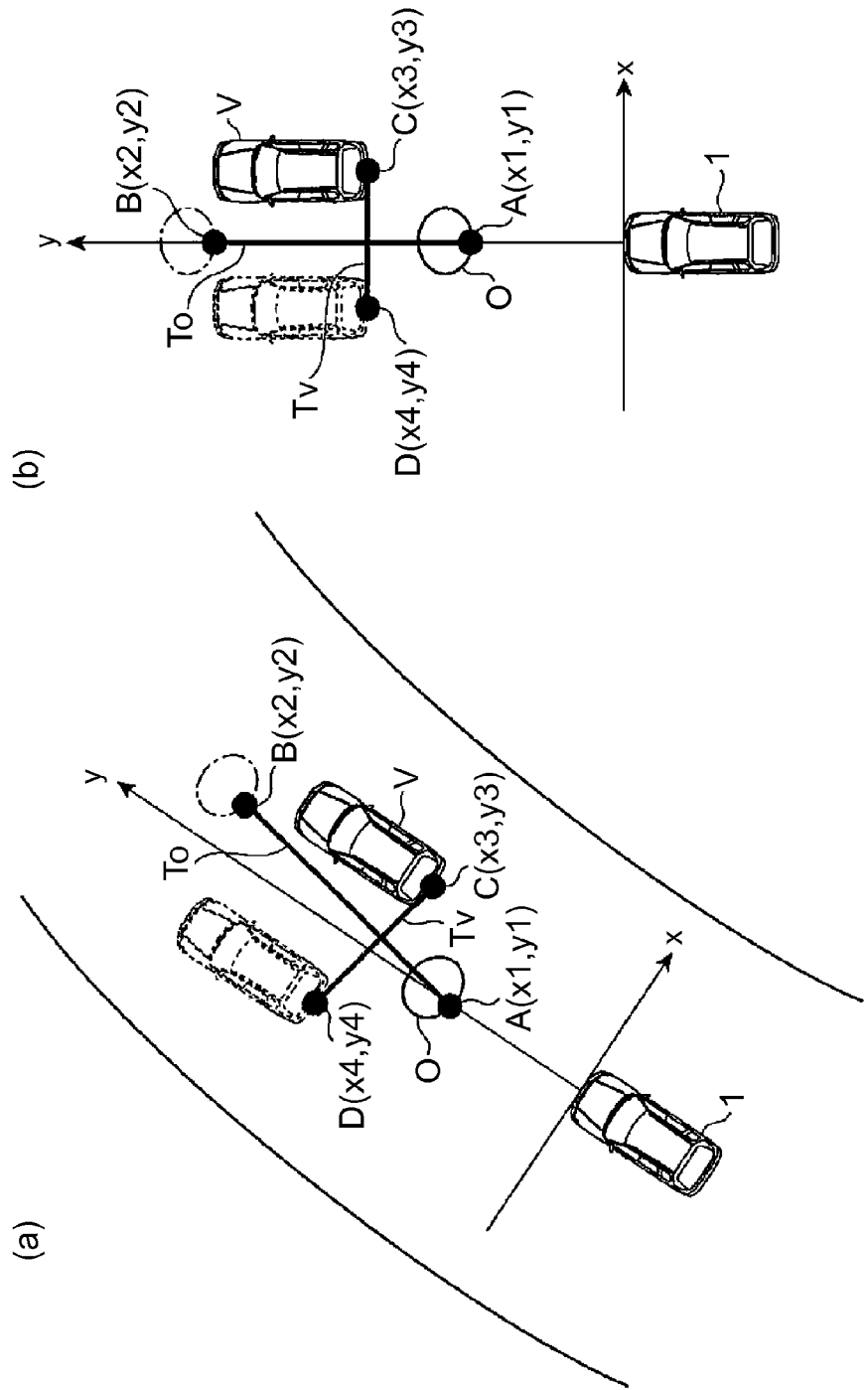
FIG. 6 is a diagram illustrating a method of calculating a movement locus of a stationary object on a curved road on the basis of a detected position and an estimated position.

FIG. 6 is a diagram illustrating a method of calculating the movement locus To of the stationary object O on a curved road on the basis of the detected position Do and the estimated position Eo. FIG. 6(a) illustrates the relative positional relationship of the preceding vehicle V and the stationary object O to the vehicle 1. In this example, the preceding vehicle V moves from the detected position D to the detected position C with a constant inter-vehicle gap from the vehicle 1. The stationary object O is first detected at the detected position A and thus the position B before the predetermined time T is estimated retroactively from the position A.

Here, the estimated position B on the curved road is calculated using the average vehicle speed of the vehicle 1 and the curvature radius R. The curvature radius R is estimated on the basis of the steering angle information acquired for the predetermined time T. The estimated value y2 of the relative distance is calculated in the same way as in the straight road. The estimated value x2 of the relative transverse position is calculated as follows in consideration of the curvature radius R of the curved road.

Figure 7:
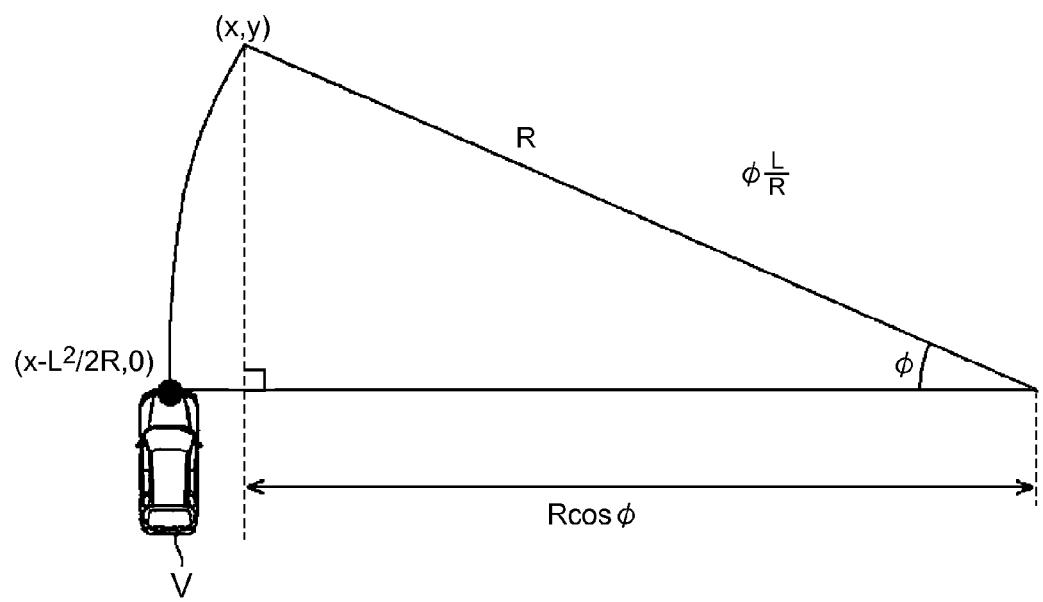
FIG. 7 is a diagram illustrating a method of calculating a relative transverse position of a stationary object on a curved road.

FIG. 7 is a diagram illustrating a method of calculating the relative transverse position of the stationary object O on the curved road. As illustrated in FIG. 7, the coordinate in the x direction of a second position with respect to a first position (x, y) on the curved road is expressed by the left side of Expression (5). Here, the curvature radius of the curved road is defined as R, the angular displacement is defined as $\phi$, and the arc length is defined as L($\approx$y).

$$x - (R - R\cos\phi) = x - R(1 - \cos\phi) \quad (5)$$

cos $\phi$ in Expression (5) is Taylor-expanded, the following expression is obtained.

$$\cos\phi = 1 - \phi^2/2! + \phi^4/4! + \ldots + (-1)^n\phi^{2n}/(2n)! + \ldots \quad (6)$$

Here, since $\phi$=L/R, an error due to omission of higher-order terms decreases by L<<R. Accordingly, Expression (5) is converted into Expression (7).

$$x - (R - R\cos\phi) \approx x - R[1 - \{1 - L^2/(2!\cdot R^2)\}] \quad (7)$$
$$= x - L^2/(2R)$$

Therefore, the estimated value x2 is calculated by substituting the detected value x1 for x on the right side of Expression (7), substituting the displacement in the y direction calculated in the same way as in the straight road for L, and substituting the curvature radius R.

Accordingly, as illustrated in FIG. 6(b), the movement locus To of the stationary object O is calculated as the line segment AB connecting the detected position A(x1, y1) and the estimated position B(x2, y2) in the same way as in the straight road. The detected position B(x2, y2) is similarly calculated using the method of calculating the movement locus To of the stationary object O on the basis of the detected position Do on the curved road.

When the movement loci Tv, To are calculated, the intersection determining unit 13 determines whether the movement loci Tv, To intersect each other in step S17 of FIG. 2. Accordingly, the passability of the preceding vehicle V through the stationary object O is determined.

Figure 8:
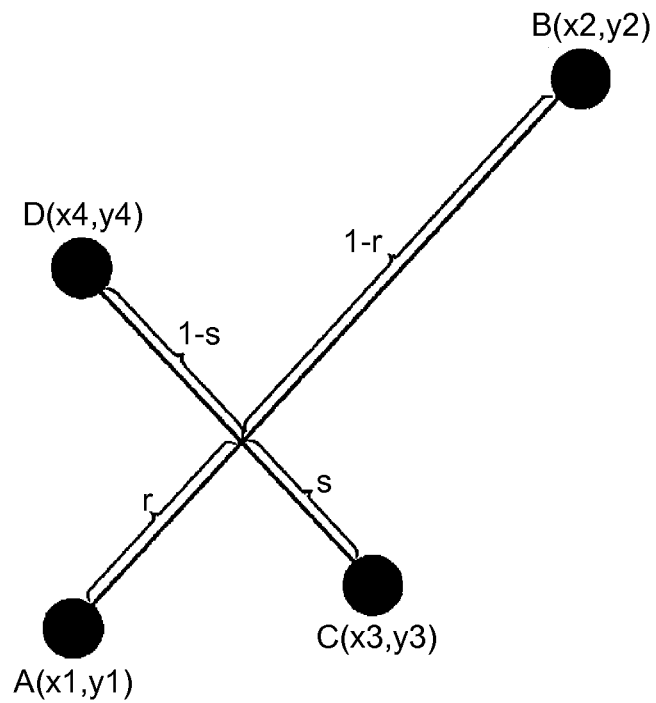
FIG. 8 is a diagram illustrating a method of determining passability.

FIG. 8 is a diagram illustrating a passability determining method. A point P on the line segment AB connecting the position A(x1, y1) and the position B(x2, y2) and a point Q on the line segment CD connecting the position C(x3, y3) and the position D(x4, y4) are expressed by Expressions (8) and (9). Here, r represents the ratio of the length from the position A to the point P to the length of the line segment AB (0≤r≤1) and s represents the ratio of the length from the position C to the point Q to the length of the line segment CD (0≤s≤1).

$$P = A + r(B - A) \quad (8)$$

$$Q = C + s(D - C) \quad (9)$$

In this case, the intersection of the line segment AB and the line segment CD can be determined using Expressions (10) to (13).

$$P=Q \tag{10}$$

By substituting Expressions (8) and (9) for Expression (10), Expression (11) is obtained.

$$A+r(B-A)=C+s(D-C) \tag{11}$$

By inputting the coordinates of the positions A, B, C, and D for Expressions (11), Expressions (12) and (13) are obtained.

$$x1+r(x2-x1)=x3+s(x4-x3) \tag{12}$$

$$y1+r(y2-y1)=y3+s(y4-y3) \tag{13}$$

The intersection of the line segment AB and the line segment CD is determined on the basis of the solutions to the simultaneous equations including Expressions (12) and (13). That is, when conditions of $0<r<1$ and $0<s<1$ are satisfied, it is determined that the line segments AB and CD intersect each other. On the other hand, when any condition of $r \leq 0$, $r \geq 1$, $s \leq 0$, and $s \geq 1$ is satisfied, it is determined that the line segments AB and CD do not intersect each other.

In step S18 of FIG. 2, when it is determined in step S17 that the movement loci Tv, To intersect each other, the intersection determining unit 13 determines whether the positions of the preceding vehicle V and the stationary object O coincide with each other at the time of getting closest to each other. Accordingly, when it is determined that there is a possibility that the preceding vehicle V passes through the stationary object O, it is determined whether the preceding vehicle V actually passes through the stationary object O.

Figure 9:
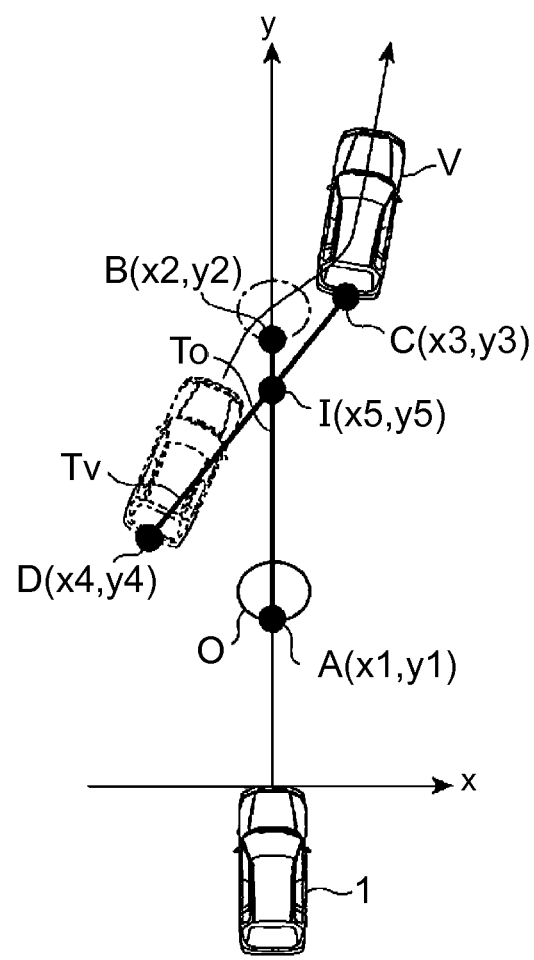
FIG. 9 is a diagram illustrating a passage determining method.

FIG. 9 is a diagram illustrating a passage determining method. As illustrated in FIG. 9, when the preceding vehicle V moves transversely in a place apart from the stationary object O, the preceding vehicle V does not pass through the stationary object O but the movement loci Tv, To may intersect each other. Accordingly, in order to prevent erroneous determination in the determination of passability, a passage determination process is performed.

Accordingly, the position I(x5, y5) of the stationary object O at the time point getting closest to the preceding vehicle V is calculated from Expressions (14), (15) with reference to FIG. 8. The time point Tp (retroactive time up to the time point at which both is closest to each other) of getting closest to each other is calculated from Expression (16). Here, r in Expressions (14) to (16) is calculated using Expressions (8), (9).

$$x5=(x2-x1)r+x1 \tag{14}$$

$$y5=(y2-y1)r+y1 \tag{15}$$

$$Tp=T \times r \tag{16}$$

Then, as described with reference to FIG. 3, the presence area A of the preceding vehicle V at the time point is set on the basis of the detected position (position I) at the time of getting closest to each other. When the stationary object O is located in the presence area A of the preceding vehicle V, it is determined that both positions coincide with each other at the time of getting closest to each other, that is, that the preceding vehicle V passes through the stationary object O.

In step S19 of FIG. 2, when it is determined in step S18 that the positions of the preceding vehicle V and the stationary object O coincide with each other at the time of getting closest to each other, that is, when it is determined that the preceding vehicle V passes through the stationary object O, the object recognizing unit 14 recognizes the stationary object O as an object not serving as an obstacle in traveling of the vehicle 1. On the other hand, when it is determined in step S17 that the movement loci Tv, To do not intersect each other, or when it is determined in step S18 that the positions of the preceding vehicle V and the stationary object O do not coincide with each other at the time of getting closest to each other, the process flow ends.

Then, when it is determined in step S18 that the positions of the preceding vehicle V and the stationary object O coincide with each other at the time of getting closest to each other, the traveling control unit 15 does not perform a predetermined control of outputting a control signal to the brake mechanism and the steering mechanism or the like so as to avoid a collision with the obstacle. After it is determined in step S19 that the preceding vehicle V passes through the stationary object O, the traveling control unit 15 may suppress the performing of the collision avoiding control.

Figure 10:
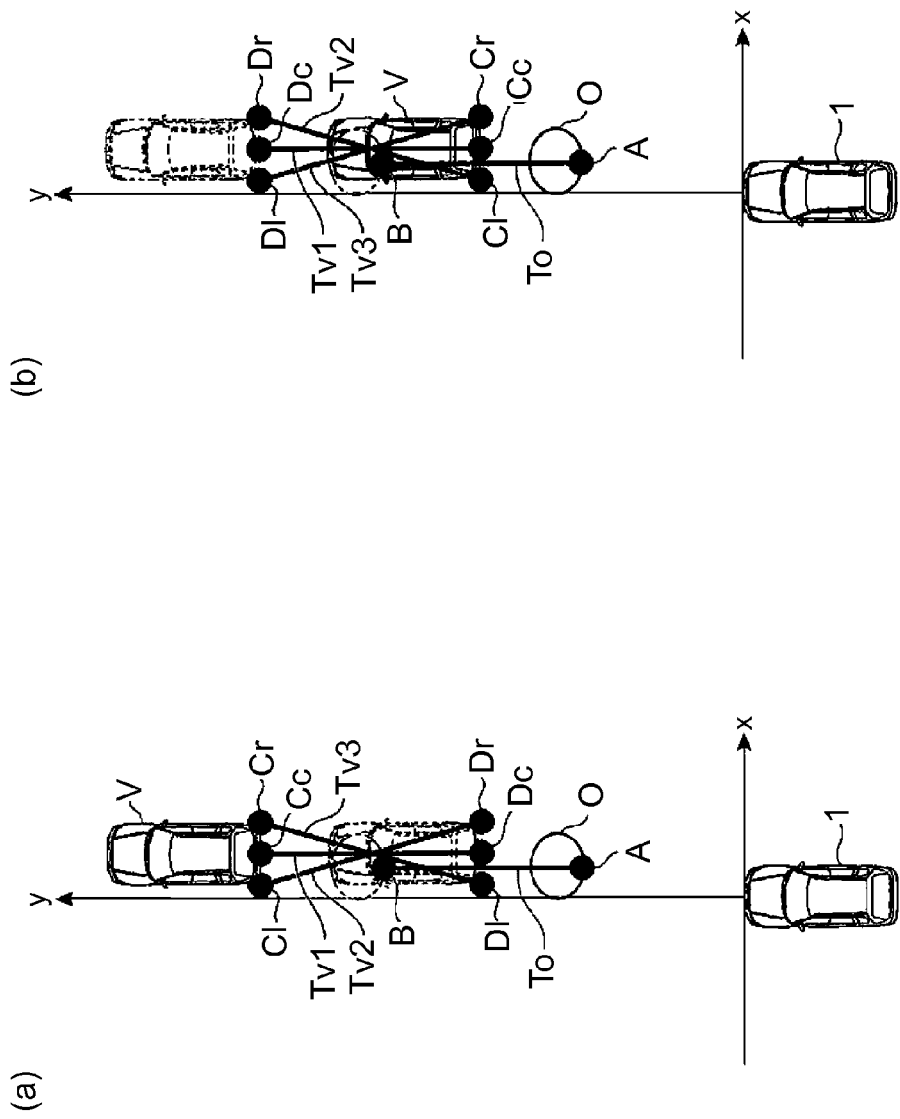
FIG. 10 is a diagram illustrating a modification example of a passability determining method.

FIG. 10 is a diagram illustrating a modification example of the passability determining method. In the above-mentioned method, the movement locus Tv of the preceding vehicle V is calculated on the basis of the movement locus of one point on the preceding vehicle V such as the center of the rear part of the vehicle body. Accordingly, depending on the positional relationship between the preceding vehicle V and the stationary object O, the preceding vehicle V has passed through the stationary object O but the movement loci Tv, To may not intersect each other.

Accordingly, plural points, for example, first and second points, including the point corresponding to the detected position or the estimated position are set on the vehicle body of the preceding vehicle V. Then, a first movement locus connecting the current first point and the second point before the predetermined time T and a second movement locus connecting the current second point and the first point before the predetermined time T are calculated. It is determined whether any of the first and second movement loci intersects the movement locus To of the stationary object O. Here, it is preferable that the plural points be set so that the plural movement loci intersect each other.

For example, in the example illustrated in FIG. 10, first, two points (left points Cl, Dl, right points Cr, Dr) are set to both sides with the vehicle width interposed therebetween in addition to the detection point (central points Cc, Dc) at the center of the rear part of the vehicle body. Then, in addition to a first movement locus Tv1 connecting the central points Cc, Dc, a second movement locus Tv2 connecting the current left point Cl and the right point Dr before the predetermined time T and a third movement locus Tv3 connecting the right point Cr and the left point Dl are calculated. It is determined whether any of the first to third movement loci Tv1 to Tv3 passes through the movement locus To of the stationary object O.

For example, as illustrated in FIG. 10(a), in a situation in which the inter-vehicle distance increases, the third movement locus Tv3 intersects the movement locus To of the stationary object O with the passage of the preceding vehicle V through the stationary object O. Similarly, as illustrated in FIG. 10(b), in a situation in which the inter-vehicle distance decreases, the second movement locus Tv2 intersects the movement locus To of the stationary object O with the passage of the preceding vehicle V through the stationary object O. In this way, by calculating the movement loci Tv1 to Tv3 of the preceding vehicle V on the basis of the movement loci of plural points set on the preceding vehicle V such as the rear-left part and the rear-right part of the vehicle body, it is possible to determine whether the movement loci Tv, To intersect each other with high accuracy.

As described up to now, the object recognition device according to this embodiment can easily determine whether the preceding vehicle V passes through the stationary object O by determining whether the movement locus Tv of the preceding vehicle V and the movement locus To of the stationary object O intersect each other, and can rapidly recognize an object not serving as an obstacle in traveling of the vehicle 1 with high accuracy.

By estimating the position of the stationary object O at a time point before the stationary object O and calculating the movement locus To of the stationary object O, it is possible to appropriately recognize an object not serving as an obstacle even when the detection of the stationary object O is delayed.

When the movement loci Tv, To intersect each other, it is possible to accurately recognize an object not serving as an obstacle, by determining whether the positions of the preceding vehicle V and the stationary object O coincide with each other when the preceding vehicle V and the stationary object O are closest to each other and recognizing the stationary object.

By calculating the movement locus To of the stationary object O on the basis of a road shape in front of the vehicle 1, it is possible to calculate the movement locus To of the stationary object O with high accuracy and to appropriately recognize an object not serving as an obstacle.

By calculating the movement locus Tv of the preceding vehicle V on the basis of the movement histories of plural points set on the preceding vehicle V, it is possible to calculate the movement locus Tv of the preceding vehicle V with high accuracy and to accurately recognize an object not serving as an obstacle.

The vehicle controller according to this embodiment can easily determine whether the preceding vehicle V passes through the stationary object O by determining whether the movement locus Tv of the preceding vehicle V and the movement locus To of the stationary object O intersect each other, and can control the traveling of the vehicle 1 on the basis of the determination result.

The above-mentioned embodiment describes a best mode of the object recognition device and the vehicle controller according to the present invention, and the object recognition device and the vehicle controller according to the present invention are not limited to the description of this embodiment. The object recognition device and the vehicle controller according to the present invention can be embodied by modifying or applying the object recognition device and the vehicle controller according to this embodiment to other devices without departing from the gist of the appended claims.

The present invention may be applied to a program for appropriately recognizing an object not serving as an obstacle in traveling of the vehicle 1 or a computer-readable recording medium having the program recorded thereon in the same way as described above. The present invention may be applied to a program for controlling the traveling of the vehicle 1 or a computer-readable recording medium having the program recorded thereon in the same way as described above.

REFERENCE SIGNS LIST

1: vehicle
2: sensor
10: ECU
11: first locus calculating unit
12: second locus calculating unit
13: intersection determining unit
14: object recognizing unit
15: traveling control unit
V: preceding vehicle
O: stationary object
Tv: movement locus of preceding vehicle

The invention claimed is:

1. An object recognition device comprising:
an object detecting unit that detects a preceding vehicle and a stationary object on a road;
a first locus calculating unit that calculates a relative movement locus of the preceding vehicle to a vehicle on the basis of a history of a detected position of the preceding vehicle;
a second locus calculating unit that calculates a relative movement locus of the stationary object to the vehicle on the basis of a history of a detected position of the stationary object; and
an object recognizing unit that recognizes the stationary object as an object not serving as an obstacle in traveling when the movement loci intersect each other.

2. The object recognition device according to claim 1, wherein the second locus calculating unit estimates the position of the stationary object at a time point before the stationary object is detected, and calculates the movement locus of the stationary object on the basis of the detected position and the estimated position of the stationary object.

3. The object recognition device according to claim 1, further comprising an intersection determining unit that determines whether the positions of the preceding vehicle and the stationary object coincide with each other when the movement loci intersect each other and the preceding vehicle and the stationary object are closest to each other,
wherein the object recognizing unit recognizes the stationary object as an object not serving as an obstacle in traveling when the positions of the preceding vehicle and the stationary object coincide with each other.

4. The object recognition device according to claim 1, wherein the second locus calculating unit calculates the movement locus of the stationary object on the basis of a road shape in front of the vehicle.

5. The object recognition device according to claim 1, wherein the first locus calculating unit calculates the movement locus of the preceding vehicle on the basis of movement histories of a plurality of points set on the preceding vehicle.

6. A vehicle controller comprising:
an object detecting unit that detects a preceding vehicle and a stationary object on a road;
a first locus calculating unit that calculates a relative movement locus of the preceding vehicle to a vehicle on the basis of a history of a detected position of the preceding vehicle;
a second locus calculating unit that calculates a relative movement locus of the stationary object to the vehicle on the basis of a history of a detected position of the stationary object; and
a traveling control unit that suppresses performing of a collision avoiding control when the movement loci intersect each other.

* * * * *